June 13, 1967  J. A. ANDERSON ETAL  3,325,221
WHEEL COVER
Filed March 1, 1965
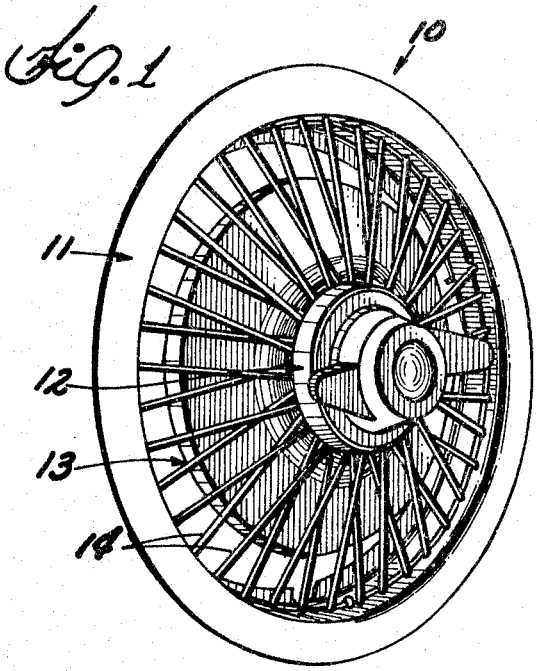
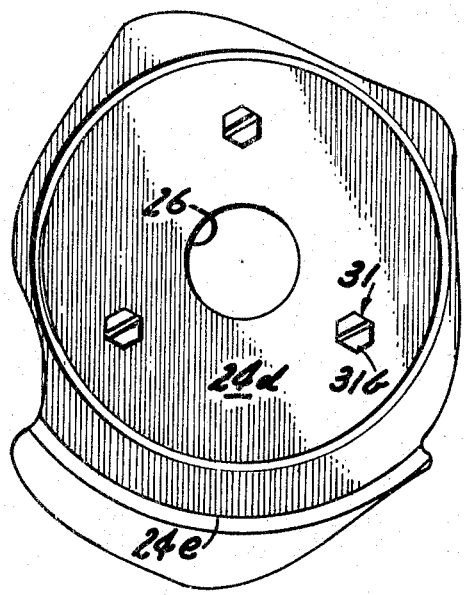
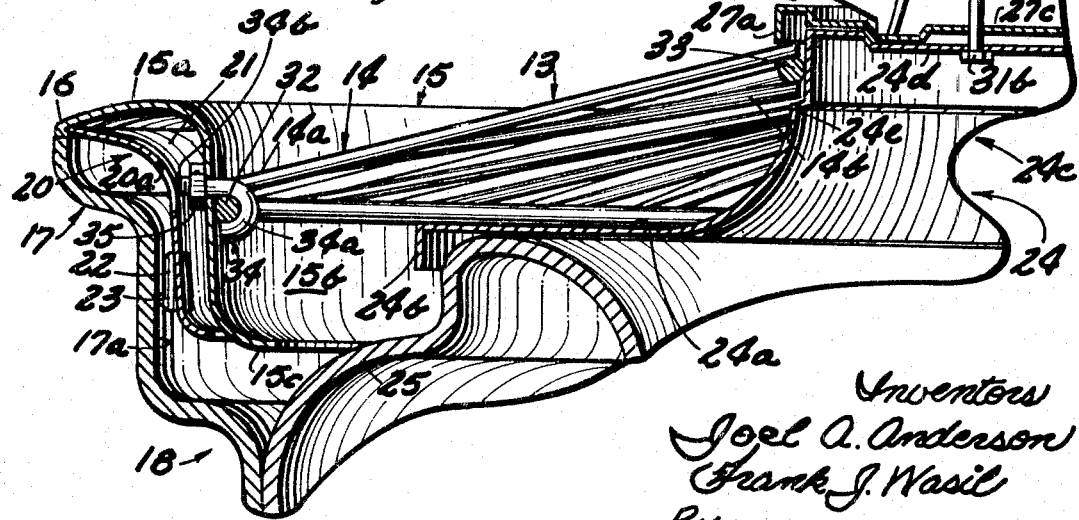
Inventors
Joel A. Anderson
Frank J. Wasil
By
Pendleton, Neuman,
Seibold & Williams
Attorneys

United States Patent Office 3,325,221
Patented June 13, 1967

3,325,221
WHEEL COVER
Joel A. Anderson, River Forest, and Frank J. Wasil, Chicago, Ill., assignors to Namsco, Inc., Bellwood, Ill., a corporation of Illinois
Filed Mar. 1, 1965, Ser. No. 435,799
4 Claims. (Cl. 301—37)

This invention relates to a wheel cover and more particularly to a cover which is adapted to fully overlay the exposed side of a wheel rim and to enhance the esthetic appearance of the wheel.

Ornamentation of the wheels of present day automobiles has become an important adjunct to the attractive overall appearance of the vehicle. In many new cars the purchasers thereof have the option to purchase as an added accessory dress-up full wheel covers. The added cost of these covers varies widely depending upon the make of the car, the size of the wheel to be covered, the quality of the materials used, and the complexity of the exterior design of the cover.

Many years ago, and even today in certain model automobiles, the wheel rim, or sometimes merely referred to as the wheel without the tire mounted thereon, is made sufficiently decorative in appearance so as not to require wheel covers or the like. An example of such a wheel is the well known wire wheel. In such wheels a hub section is provided which is secured to the end of the axle. The hub section, in turn, is connected to a tire engaging rim by a plurality of substantially radially extending individual spokes formed from metallic rods of high quality. The spokes have the ends thereof threadably connected to suitable internally threaded sockets mounted on both the hub section and tire rim. While such wire wheels were considered most elegant from an esthetic standpoint, they were, however, most undesirable from a cost, service, and maintenance standpoint. As a result of this latter consideration, such wire wheels were to be found normally on the custom-made or costly model automobile. In lower price cars such wheels were replaced by wheels having a one piece spider section of superior strength which combined the hub section and the individual spokes. This spider type wheel construction has been incorporated in a substantial majority of the present model automobiles.

Because of the style conscious and discriminating tastes of the public when it comes to the selection of an automobile, automobile and accessory manufacturers have in recent years been attempting in many instances to simulate the deluxe wire wheel appearance in dress-up covers to be mounted on spider type wheels.

Many of these simulated wire wheel covers have been successful only to a limited extent because of their cost or on the other hand because of their poor quality and unattractive appearance.

Thus, it is an object of this invention to provide a simulated wire wheel cover which is inexpensive to produce and yet presents an authentic appearance of a high quality wire wheel.

It is a further object of this invention to provide a decorative wheel cover which is adapted to fit all standard size spider type wheels.

It is a further object of this invention to provide a simulated wire wheel cover formed of a minimal number of parts any of which may be readily replaced when desired without requiring replacement of the remaining parts.

Further and additional objects will appear from the description, accompanying drawing, and appended claims.

In accordance with one embodiment of this invention a wheel cover is provided which comprises an outer rim for mounting concentrically within the tire trim of a conventional spider type wheel. The wheel cover also includes a hub unit which is spaced from and concentrically arranged within said outer rim. The outer rim and hub assembly are interconnected by a spoke assembly. The spoke assembly includes an outer ring which is in contact with and secured to the outer rim, an inner ring which is in contact with and secured to the hub assembly, and a plurality of spokelike elements disposed in symmetrical substantially radially extending relation and having the opposite ends thereof affixed to said inner and outer rings. The inner and outer rings and the spokelike elements are made unitary prior to being assembled with the outer rim and hub assembly.

For a more complete understanding of this invention reference should be made to the drawing wherein:

FIG. 1 is a perspective front view of one form of the improved wheel cover.

FIG. 2 is an enlarged fragmentary sectional view taken along a radially disposed section line and showing the cover mounted on a wheel.

FIG. 3 is an enlarged fragmentary rear view of the cover shown in FIG. 1.

Referring now to the drawing and more particularly to FIG. 1, one embodiment of the improved wheel cover 10 is shown which in this instance is intended to simulate a wire wheel. Cover 10 comprises the following basic parts: an outer rim 11, a hub assembly 12, and a spoke assembly 13. Assembly 13 is herein illustrated and hereinafter described as a spoke assembly, however, the invention is not intended to be limited thereto as other ornamental devices besides spoke elements 14 may be utilized, which if incorporated on the wheel itself would require costly individual assembly.

The outer rim 11 of the cover in the illustrated embodiment, see FIG. 2, includes an annular piece 15 preferably of metal and normally formed by stamping or some other well known means. Piece 15 has an S-like cross-sectional appearance and has a substantially radially extending outer flange section 15a, which is adapted to substantially conceal the outer marginal portion 16 of the tire rim section 17 of a conventional spider type wheel 18. Flange section 15a has a slight convex cross section as seen in FIG. 2. The convexity of section 15a provides added strength to the outer rim 11 as well as a pleasing appearance. The inner portion of flange section 15a is made integral with an intermediate section 15b of the rim 11. Section 15b extends inwardly toward the wheel 18 and is slightly tapered toward the wheel axis. The inner flange section 15c of rim 11 is rounded or flared inwardly a slight amount toward the wheel axis. Sections 15b–c cooperate to give the cover a pleasing visual effect of considerable depth relative to section 15a. Rim sections 15a–c effectively conceal the tire rim portion 17 of wheel 18. The exposed surfaces of sections 15a–c are made lustrous by either polishing or being plated or coated with a suitable material.

Disposed intermediate the tire rim 17 and the concealed side of outer rim 11 and carried by the latter is an attachment member 20 which may include a separate annular piece 21, see FIG. 2, on which are mounted a plurality of symmetrically arranged spring clips 22. Each clip is provided with teeth-like projections 23, which frictionally engage portion 17 of wheel 18. The illustrated attachment member 20 is well known in the art and other types of attaching means may be employed, if desired, as the attaching means per se forms no part of the present invention.

The hub unit or assembly 12, in the illustrated embodiment, includes an annular skirt-like member 24 having an outer section 24a which is disposed between the spider section 25 of the wheel 18 and the spoke assembly 13 of the cover 10 when the latter has been mounted on the wheel. The outer peripheral edge of section 24a is delimited by an inwardly axially extending flange 24b. Flange 24b provides stiffness for piece 24 notwithstanding that the latter may be formed of relatively thin gauge material. Integral with skirt-like member 24 is an outwardly substantially axially projecting central section 24c. The outermost projecting portion of central section 24c terminates in a plateau portion 24d. The sides of central section 24c flare outwardly and are made integral with outer section 24a. At the point where the sides of the central section 24c begin to flare there is provided a ledge or shoulder 24e, the function of which will be discussed more fully hereinafter. An axially centered opening 26, see FIG. 3, is provided in the plateau portion 24d to compensate for any axially extending protuberance formed on the end of the axle which might otherwise interfere with the positioning of the cover on the wheel. Opening 26 also serves an important function in facilitating locating the member 24 with respect to outer rim 11 when the rim and member are disposed on an assembly chuck during assembling of the cover parts.

The hub assembly 12 also includes a substantially disc-shaped piece 27 having a marginal flange 27a which extends inwardly axially a short distance. Flange 27a cooperates with shoulder 24e of member 24 so that the inner portion of the spoke assembly 13 is clamped therebetween. Piece 27 overlays plateau portion 24d and is provided with various stiffening embossments or ribs 27b. On an outer exposed center portion of piece 27 may be mounted an ornamental piece 28, which in the illustrated embodiment is in the form of a well known spinner or knock-off having a pair of wing-like projections 28a. Obviously piece 28 may take various other forms and in some instances may be omitted entirely in which case the center portion 27c of piece 27 will be fully exposed and may be shaped to present an esthetic appearance.

The center or hub portion 28b of piece 28 is provided with a plurality of symmetrically arranged inwardly extending, internally threaded sockets 30, which are adapted to receive the threaded ends of elongated assembly bolts 31. The shank 31a of each bolt passes through registered openings formed in plateau portion 24d and central portion 27c. The head 31b of each bolt 31 engages the back surface of plateau portion 24d of member 24, see FIGS. 2 and 3, and thus are concealed when the cover is positioned on the wheel 18.

Spoke assembly 13 includes an outer ring 32, a concentrically disposed inner ring 33, and a plurality of spoke elements 14, previously identified. The rings 32 and 33 and the spoke elements 14 may, if desired, be formed from metallic round bar stock of suitable cross-sectional diameter. It is preferred that rings 32 and 33 and elements 14 be made lustrous either by polishing or coating with a suitable material so as to match the lustrous appearance of the outer rim 11 and the exposed surfaces of the hub assembly 12 which have been similarly treated. The outer ring 32 is shaped to conform substantially to the exposed surface configuration of rim section 15b. In the illustrated embodiment the outer ring 32 is disposed substantially at mid-plane between sections 15a and c, see FIG. 2. The outer peripheral dimension of ring 32 should be such as to permit the ring to readily assume its proper location. The slightly tapered exposed surface configuration of rim section 15b facilitates locating of ring 32.

Inner ring 33 is sized so as to enable it to readily slip over central portion 24d of the member 24 and yet will not slip past shoulder 24e.

Interconnecting rings 32 and 33 are the spoke elements 14. The outer end 14a of each element 14 rests upon and is secured by welding or the like to the upper peripheral segment of ring 32. The inner ends 14b of elements 14 are alternately secured to upper and lower peripheral segments of inner ring 33. In the illustrated embodiment, the outer ends 14a of the elements are uniformly spaced and symmetrically arranged about ring 32. The inner ends 14b of alternate elements, however, while uniformly spaced and symmetrically arranged on the ring 33 are all slightly offset in one direction with respect to a true radial projection from ring 33. The inner ends of the remaining elements, on the other hand, are all offset a slight amount in the opposite direction with respect to the same radial projection. Thus, when looking at the exposed side of the cover 10, each pair of corresponding elements 14 appear to intersect one another just beyond the perimeter of piece 27. It is obvious that the number, relative position, and shape of the elements 14 may be varied from that shown, so as to give a different esthetic appearance.

The various components comprising the spoke assembly 13 may be readily assembled in a suitable jig and the spot-welding of all, or substantially all, of the spoke ends to the rings may occur in either a single or two step operation. Because the outer ends of the elements 14 terminate immediately adjacent the exposed surface of outer rim section 15b, they appear to be individually affixed thereto. The same visual impression is created with respect to the inner ends of the elements, because of the fact that ring 32 and element ends connected thereto are disposed behind the exposed flange 27a of piece 27.

In order to retain outer ring 32 in its proper position with respect to outer rim 11, a plurality of widely spaced, but symmetrically arranged, fasteners 34 are utilized. Each fastener 34, in the illustrated embodiment, has one end 34a in the form of a loop which is adapted to embrace a portion of outer ring 32 in a manner as shown in FIG. 2. The opposite end 34b of the fastener is threaded and extends through a suitable opening formed in the outer rim section 15b. A threaded nut 35 engages fastener end 34b. The peripheral dimension of nut 35 is larger than the opening through which the fastener end extends and thus, when the nut is drawn up tight on the fastener end 34b, the outer ring 32 is securely locked in place. In order to permit the nut 35 to be drawn up tight, an opening 20a is formed in attachment member 20 which is of sufficient size to enable a socket wrench head or similar tool to pass therethrough.

The exposed loop ends 34a of the fasteners 34 are made inconspicuous by having a luster which is of the same magnitude as that of the exposed surfaces of the remainder of the cover.

Thus, it will be seen that a highly decorative, eye appealing high quality wheel cover has been provided which is simple to assemble and thus inexpensive to produce, and yet is capable of having various parts thereof of different configuration substituted so as to produce a cover which would have a wide variety of esthetic appearances. Furthermore, the improved cover is capable of being readily mounted on or removed from a standard wheel without the need for special tools or the like.

While a specific embodiment of the invention has heretofore been disclosed and claimed, the invention is not intended to be limited thereto as further modifications are contemplated, and the submitted claims are deemed to be of sufficient scope to cover such further modifications.

We claim:

1. A wheel cover comprising an outer annular rim removably mountable on and in concentric relation with a wheel rim, said outer rim having an outwardly substantially radially extending first section and a substantially inwardly axially extending second section connected to the inner peripheral edge of said first section; means carried on said outer rim for securing said cover to the wheel rim; a hub unit spaced from and concentrically disposed with respect to said outer rim; and an assembly disposed intermediate and connected to said outer rim and said hub unit; said assembly including a plurality of symmetrically arranged outwardly extending substantially rectilinear rod members, an outer ring interconnecting the corresponding outer end portions of said members and affixed to said outer rim, and an inner ring interconnecting the corresponding inner end portions of said members, the outer and inner end portions of said members being symmetrically arranged on said respective outer and inner rings; said outer and inner rings and said plurality of rod members forming a unitary assembly.

2. The wheel cover recited in claim 1 wherein said annular rim, said hub unit, and said assembly are independent unitary elements capable of being replaced independently of one another.

3. The wheel cover recited in claim 1 wherein a predetermined number of said members have the inner end portions thereof affixed to one surface segment of said inner ring and the inner end portions of the remainder of said members are affixed to an opposite surface segment of said inner ring.

4. The wheel cover recited in claim 3 wherein the inner end portions of the members connected to said inner ring one surface segment are arcuately offset with respect to the inner end portions of the remainder of said members.

References Cited

UNITED STATES PATENTS

| | | | |
|---|---|---|---|
| 2,710,775 | 6/1955 | Buerger | 301—37 |
| 2,722,460 | 11/1955 | Dieterich | 301—37 |
| 2,746,806 | 5/1956 | Jenkins | 301—37 |
| 3,145,062 | 8/1964 | Judd | 301—37 |
| 3,174,803 | 3/1965 | Mulhern | 301—37 |

BENJAMIN HERSH, *Primary Examiner.*

R. J. JOHNSON, *Assistant Examiner.*